(12) United States Patent
Melwin et al.

(10) Patent No.: US 12,474,076 B2
(45) Date of Patent: Nov. 18, 2025

(54) SYSTEM AND METHOD FOR OPERATING A COMPRESSOR OF AN HVAC SYSTEM

(71) Applicant: Johnson Controls Tyco IP Holdings LLP, Milwaukee, WI (US)

(72) Inventors: Ewin Ramster Melwin, Navi Mumbai (IN); Jeremy Ryan Smith, Park City, KS (US); Tejas Mahendra, Pune (IN); Pushpak Macchindra Doiphode, Thane (IN); Narendra Madhukar Jagtap, Pune (IN); Rahul Krushna Salunke, Aurangabad (IN); Naveen Ramanagouda Patil, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 191 days.

(21) Appl. No.: 18/128,803

(22) Filed: Mar. 30, 2023

(65) Prior Publication Data
US 2023/0349583 A1 Nov. 2, 2023

(30) Foreign Application Priority Data
Mar. 31, 2022 (IN) .............................. 202221019315

(51) Int. Cl.
*F25B 49/02* (2006.01)
*F24F 11/86* (2018.01)
*F24F 110/12* (2018.01)

(52) U.S. Cl.
CPC ............ *F24F 11/86* (2018.01); *F25B 49/022* (2013.01); *F24F 2110/12* (2018.01); *F25B 2500/19* (2013.01); *F25B 2600/01* (2013.01); *F25B 2600/0253* (2013.01);
(Continued)

(58) Field of Classification Search
CPC ..... F24F 11/86; F24F 2110/12; F25B 49/022; F25B 2500/19; F25B 2600/01; F25B 2600/0253; F25B 2700/1933; F25B 2700/2106
See application file for complete search history.

(56) References Cited

U.S. PATENT DOCUMENTS

| | | | |
|---|---|---|---|
| 6,622,500 B1 * | 9/2003 | Archibald | B60H 1/3205 62/228.3 |
| 2017/0089603 A1 * | 3/2017 | Bentz | F24F 11/871 |
| 2019/0092134 A1 * | 3/2019 | Vehr | B60H 1/3222 |

OTHER PUBLICATIONS

DE 10 2020 103 862 (English Translation) (Year: 2020).*
WO 2022/059053 (English Translation) (Year: 2022).*

* cited by examiner

*Primary Examiner* — Jonathan Bradford
(74) *Attorney, Agent, or Firm* — Fletcher Yoder, PC

(57) ABSTRACT

A heating, ventilation, and/or air conditioning (HVAC) system includes a variable capacity compressor and a controller communicatively coupled to the variable capacity compressor. The controller is configured to receive data indicative of an operating parameter of the HVAC system, determine an upper suction pressure limit of the HVAC system based on the data, determine a lower suction pressure limit of the HVAC system based on the data, determine a target suction pressure value, wherein the target suction pressure value is less than or equal to the upper suction pressure limit and is greater than or equal to the lower suction pressure limit, and modulate operation of the variable capacity compressor such that a detected suction pressure of the HVAC system approaches the target suction pressure value.

19 Claims, 9 Drawing Sheets

(52) U.S. Cl.
CPC . *F25B 2700/171* (2013.01); *F25B 2700/1933* (2013.01); *F25B 2700/2106* (2013.01)

SYSTEM AND METHOD FOR OPERATING A COMPRESSOR OF AN HVAC SYSTEM

CROSS-REFERENCE TO RELATED APPLICATION

This application claims priority from and the benefit of India Provisional Patent Application No. 202221019315, entitled "A SYSTEM AND METHOD FOR OPERATING A COMPRESSOR OF AN HVAC SYSTEM," filed Mar. 31, 2022, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and air conditioning (HVAC) systems are utilized in residential, commercial, and industrial environments to control environmental properties, such as temperature and humidity, for occupants of the respective environments (e.g., enclosed spaces). For example, an HVAC system may include one or more heat exchangers, such as a heat exchanger configured to place an air flow in a heat exchange relationship with a working fluid of a vapor compression circuit (e.g., evaporator, condenser), a heat exchanger configured to place an air flow in a heat exchange relationship with combustion products (e.g., a furnace), or both. In general, the heat exchange relationship(s) may cause a change in pressures and/or temperatures of the air flow, the working fluid, the combustion products, or any combination thereof. The air flow may be directed toward the environment (e.g., enclosed space) to change conditions of the environment. Control features may be employed to control the above-described features such that an environmental parameter (e.g., temperature) of the environment reaches a target value.

Multi-stage HVAC equipment may be employed to provide heating or cooling at a faster rate and/or more efficiently than single stage HVAC equipment. For example, two stage HVAC equipment may be configured to operate in a first stage operating mode and a second stage operating mode that cause conditioning of an air flow at different respective rates. The two stage HVAC equipment may be controlled by a controller that receives a call from a thermostat and determines, in response to the call, if and when to operate the two stage HVAC equipment in the second stage operating mode. Unfortunately, traditional systems may be ill-equipped to determine if and when to initiate second stage operation of the two stage HVAC equipment, leading to inefficient heat exchange and/or lengthy amounts of time to condition the environment (e.g., enclosed space) until the call from the thermostat is satisfied. Further, traditional systems may suffer from compatibility issues associated with certain traditional thermostats and certain multi-stage HVAC equipment. Accordingly, it is now recognized that improved operation of multi-stage HVAC equipment is desired.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a variable capacity compressor and a controller communicatively coupled to the variable capacity compressor. The controller is configured to receive data indicative of an operating parameter of the HVAC system, determine an upper suction pressure limit of the HVAC system based on the data, determine a lower suction pressure limit of the HVAC system based on the data, determine a target suction pressure value, wherein the target suction pressure value is less than or equal to the upper suction pressure limit and is greater than or equal to the lower suction pressure limit, and modulate operation of the variable capacity compressor such that a detected suction pressure of the HVAC system approaches the target suction pressure value.

In another embodiment, a controller of a heating, ventilation, and air conditioning (HVAC) system includes a non-transitory, computer-readable medium having instructions stored thereon. The instructions, when executed by processing circuitry of the controller, are configured to cause the controller to receive a call for cooling, receive data indicative of an operating parameter of the HVAC system, determine an upper suction pressure limit of the HVAC system based on the data, determine a lower suction pressure limit of the HVAC system based on the data, determine a target suction pressure value of the HVAC system, wherein the target suction pressure value is less than or equal to the upper suction pressure limit and is greater than or equal to the lower suction pressure limit, iteratively reduce the target suction pressure value, and modulate operation of a compressor of the HVAC system based on the target suction pressure value.

In a further embodiment, a heating, ventilation, and air conditioning (HVAC) system includes a compressor configured to operate at variable capacities and a controller configured to communicatively couple to the compressor. The controller is configured to receive a call for cooling from a non-communicating thermostat, receive data indicative of an outdoor ambient temperature, compare the outdoor ambient temperature to a threshold temperature value, establish a lower suction pressure limit and an upper suction pressure limit based on the comparison, determine a target suction pressure value, wherein the target suction pressure value is less than or equal to the upper suction pressure limit and is greater than or equal to the lower suction pressure limit, and modulate operation of the compressor such that a detected suction pressure of the HVAC system approaches the target suction pressure value.

BRIEF DESCRIPTION OF THE DRAWINGS

Various aspects of this disclosure may be better understood upon reading the following detailed description and upon reference to the drawings in which.

DETAILED DESCRIPTION

Figure 1:
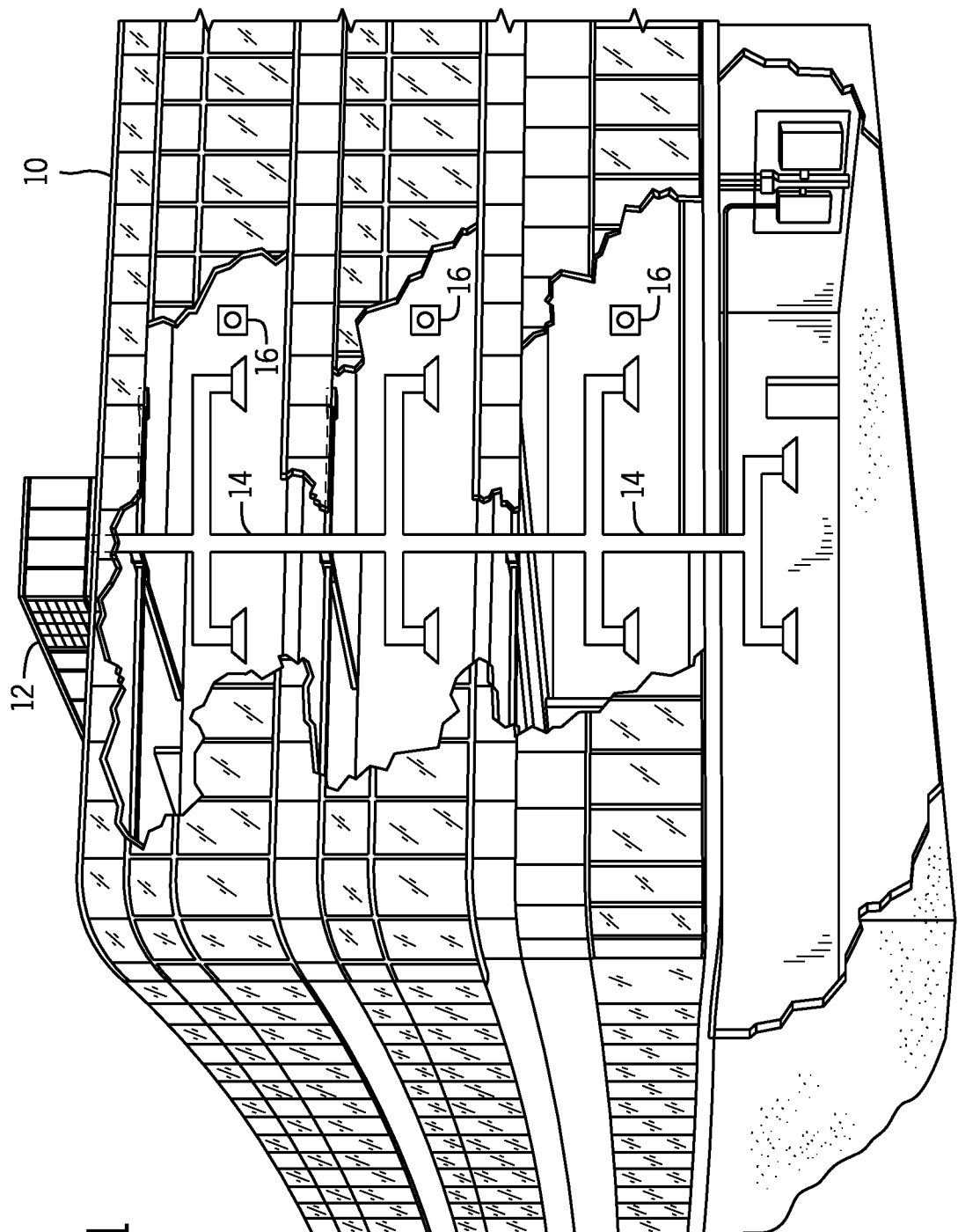
FIG. 1 is a perspective view of an embodiment of a building having a heating, ventilation, and air conditioning (HVAC) system for environmental management that may employ one or more HVAC units, in accordance with an aspect of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "approximately," "generally," and "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to mean that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to mean that the given feature is within +/−5%, within +/−4%, within +/−3%, within +/−2%, within +/−1%, or even closer, to having the described nature, such as being parallel to another feature, being perpendicular to another feature, and so forth. Further, it should be understood that mathematical terms, such as "planar," "slope," "perpendicular," "parallel," and so forth are intended to encompass features of surfaces or elements as understood to one of ordinary skill in the relevant art, and should not be rigidly interpreted as might be understood in the mathematical arts. For example, a "planar" surface is intended to encompass a surface that is machined, molded, or otherwise formed to be substantially flat or smooth (within related tolerances) using techniques and tools available to one of ordinary skill in the art. Similarly, a surface having a "slope" is intended to encompass a surface that is machined, molded, or otherwise formed to be oriented at an angle (e.g., incline) with respect to a point of reference using techniques and tools available to one of ordinary skill in the art.

The present disclosure is directed to heating, ventilation, and air conditioning (HVAC) systems. The HVAC system may include a vapor compression system configured to circulate a working fluid to condition a conditioning fluid, such as an air flow. For example, the vapor compression system may place the working fluid in a heat exchange relationship with the air flow to heat, cool, and/or dehumidify the air flow. The vapor compression system may then deliver the conditioned air flow to a space serviced by the HVAC system to condition the space.

The HVAC system may include modulating HVAC equipment, such as a compressor, configured to operate at each of a plurality of operating capacities (e.g., frequencies, speeds, stages, etc.). In accordance with present techniques, the HVAC system may further include a control system configured to enable variable operation of the modulating HVAC equipment to more efficiently satisfy a load or demand of the HVAC system.

In certain traditional systems, modulating (e.g., multi-stage) HVAC equipment, such as variable capacity compressors or variable speed compressors, may be incompatible with single stage thermostats that are designed for single stage HVAC equipment. Similarly, in certain existing systems, modulating HVAC equipment may be incompatible with other (e.g., non-modulating) HVAC equipment. Further, in certain traditional systems, modulating HVAC equipment may have limited compatibility with single stage thermostats and may include controls that are ill-equipped to determine if and when to adjust operation of the modulating HVAC equipment in a manner that provides efficient and timely environmental control of a conditioned space (e.g., enclosed space). Further still, in certain traditional systems, modulating HVAC equipment may be configured to partially interface with multi-stage thermostats, but control aspects associated with the modulating HVAC equipment and the multi-stage thermostat may nevertheless be ill-equipped to determine if and when to adjust (e.g., modulate) operation of the modulating HVAC equipment in a manner that provides efficient and timely environmental control of the conditioned space. For example, existing systems may be unable to modulate operation of the HVAC equipment based on a particular load or demand (e.g., call for conditioning) of the HVAC system and/or based on particular operating conditions of the HVAC system.

Indeed, different embodiments of thermostats (e.g., a communicating thermostat, a conventional thermostat) and/or control circuitry may be incorporated in different HVAC systems, and/or a communication link or coupling between the control system and the components of the vapor compression system may be different for different HVAC systems. As such, it may be difficult to enable the control systems of different HVAC systems to operate in a desirable manner to efficiently operate components of the HVAC system and satisfy a load or demand on the HVAC system. For example, an HVAC system may include a compressor (e.g., a modulating compressor) configured to operate at variable capacities or speeds and may also include an air handler and/or thermostat that is configured to operate with single stage equipment (e.g., a single stage compressor). In other words, the air handler and the thermostat may not be configured to enable operation of the HVAC system in multiple stages. In such instances, the thermostat and/or the air handler may be unable to adequately communicate with the modulating compressor to enable operation of the compressor across a range of capacities or speeds.

Thus, it is presently recognized that there is a desire to improve control systems of HVAC systems to enable operation of different types of HVAC equipment with one another in a more efficient manner. Accordingly, embodiments of the present disclosure are directed to a control system configured to enable variable operation of modulating HVAC equipment (e.g., a variable speed compressor) when the modulating HVAC equipment is utilized with non-modulating (e.g., non-communicating) HVAC equipment. Thus, present embodiments enable more efficient control and operation of the HVAC system to satisfy a load or demand on the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration loop to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one working fluid circuit configured to operate in different modes. In other embodiments, the HVAC unit 12 may include one or more working fluid circuits for cooling an air flow and a furnace for heating the air flow.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
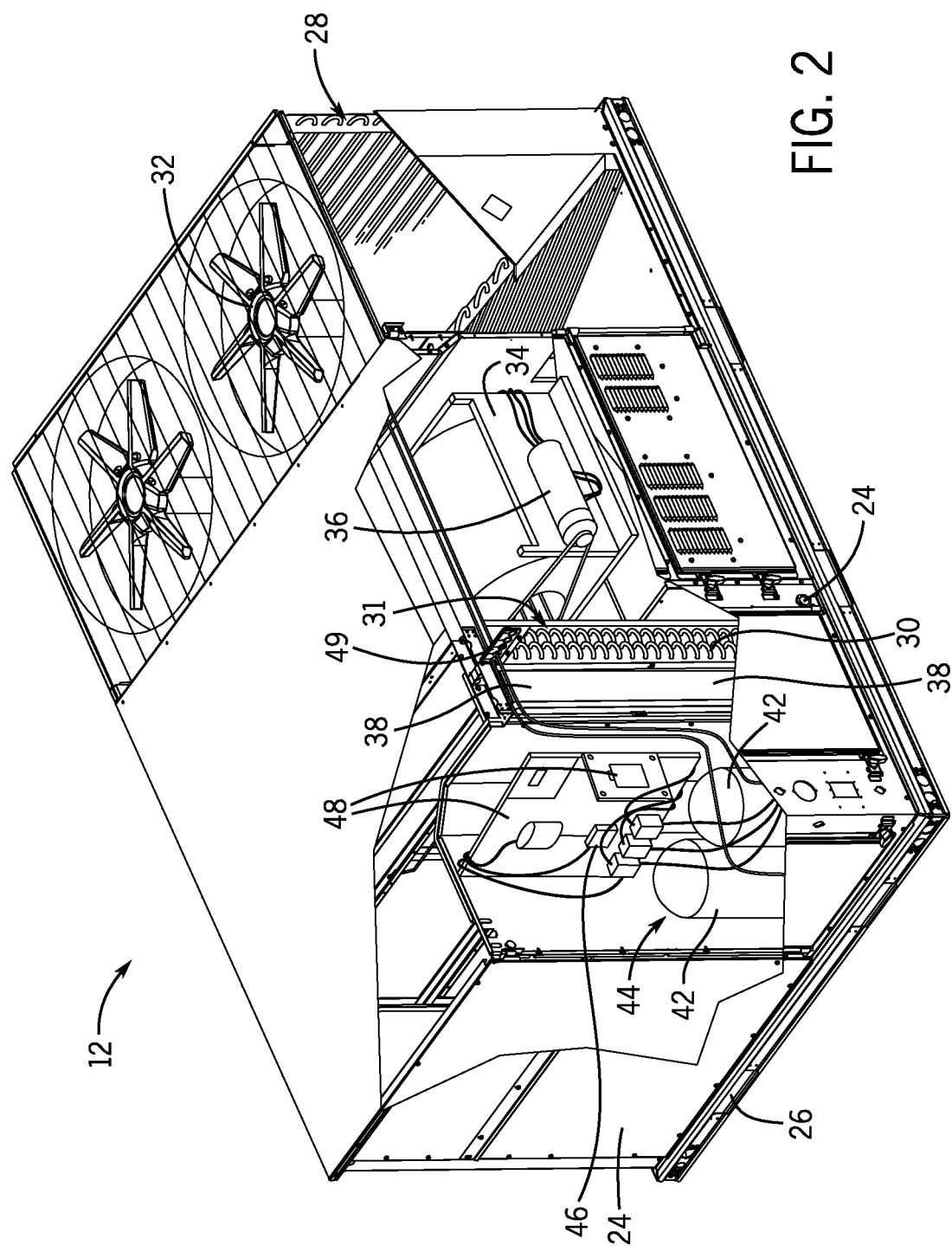
FIG. 2 is a perspective view of an embodiment of a packaged HVAC unit that may be used in an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent working fluid circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air flow provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more working fluid circuits. Tubes within the heat exchangers 28 and 30 may circulate a working fluid (e.g., refrigerant), such as R-410A, through the heat exchangers 28 and 30. The tubes may be of various types, such as multichannel tubes, conventional copper or aluminum tubing, and so forth. Together, the heat exchangers 28 and 30 may implement a thermal loop in which the working fluid undergoes phase changes and/or temperature changes as it flows through the heat exchangers 28 and 30 to produce heated and/or cooled air. For example, the heat exchanger 28 may function as a condenser where heat is released from the working fluid to ambient air, and the heat exchanger 30 may function as an evaporator where the working fluid absorbs heat to cool an air flow. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air flow that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal loop. Compressors 42 increase the pressure and temperature of the working fluid before the working fluid enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
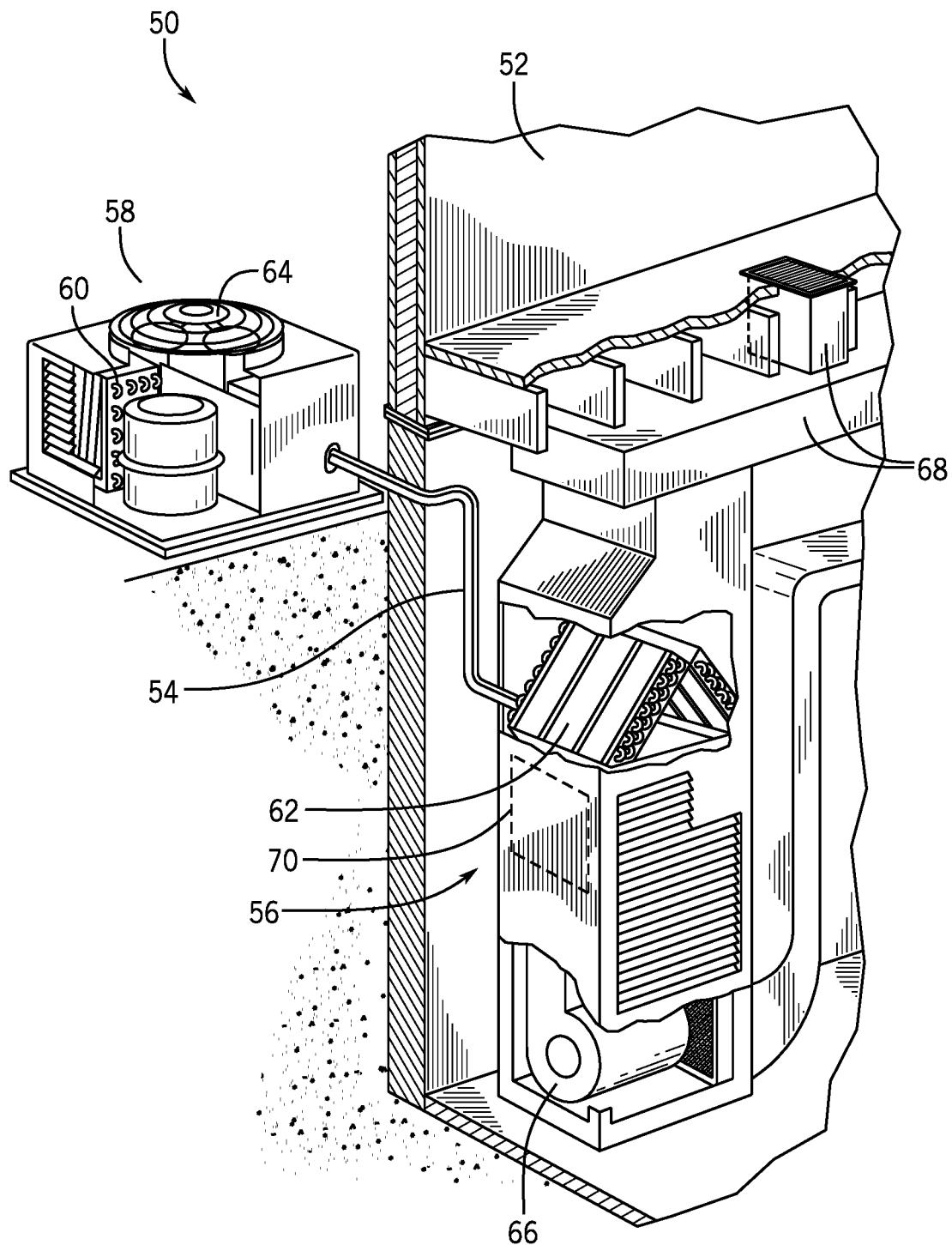
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include working fluid conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The working fluid conduits 54 transfer working fluid between the indoor unit 56 and the outdoor unit 58, typically transferring primarily liquid working fluid in one direction and primarily vaporized working fluid in an opposite direction.

When the system shown in FIG. 3 is operating as an air conditioner, a heat exchanger 60 in the outdoor unit 58 serves as a condenser for re-condensing vaporized working fluid flowing from the indoor unit 56 to the outdoor unit 58 via one of the working fluid conduits 54. In these applications, a heat exchanger 62 of the indoor unit functions as an evaporator. Specifically, the heat exchanger 62 receives liquid working fluid, which may be expanded by an expansion device, and evaporates the working fluid before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop operation of the working fluid loop temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate working fluid and thereby cool air entering the outdoor unit 58 as the air passes over the outdoor heat exchanger 60. The indoor heat exchanger 62 will receive a stream of air blown over it and will heat the air by condensing the working fluid.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower or fan 66 passes over the tubes or pipes and extracts heat from the combustion products. The heated air may then be routed from the furnace system 70 to the ductwork 68 for heating the residence 52.

Figure 4:
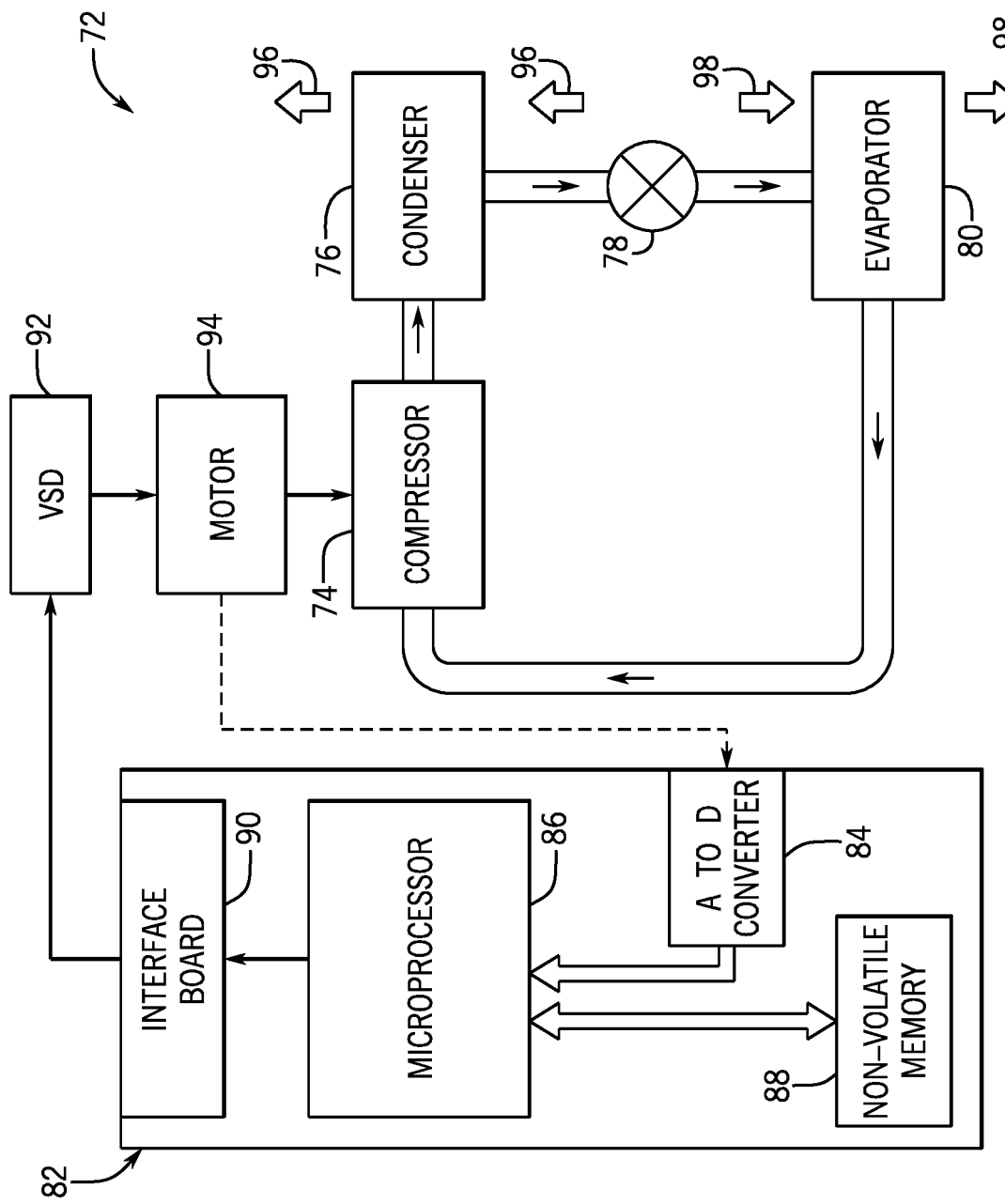
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a working fluid (e.g., refrigerant) through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a working fluid vapor and delivers the vapor to the condenser 76 through a discharge passage. In some embodiments, the compressor 74 may be a centrifugal compressor. The working fluid vapor delivered by the compressor 74 to the condenser 76 may transfer heat to a fluid passing across the condenser 76, such as ambient or environmental air 96. The working fluid vapor may condense to a working fluid liquid in the condenser 76 as a result of thermal heat transfer with the environmental air 96. The liquid working fluid from the condenser 76 may flow through the expansion device 78 to the evaporator 80.

The liquid working fluid delivered to the evaporator 80 may absorb heat from another air flow, such as a supply air flow 98 provided to the building 10 or the residence 52. For example, the supply air flow 98 may include ambient or environmental air, return air from a building, or a combination of the two. The liquid working fluid in the evaporator 80 may undergo a phase change from the liquid working fluid to a working fluid vapor. In this manner, the evaporator 80 may reduce the temperature of the supply air flow 98 via thermal heat transfer with the working fluid. Thereafter, the vapor working fluid exits the evaporator 80 and returns to the compressor 74 by a suction line to complete the loop.

In some embodiments, the vapor compression system 72 may further include a reheat coil in addition to the evaporator 80. For example, the reheat coil may be positioned downstream of the evaporator relative to the supply air flow 98 and may reheat the supply air flow 98 when the supply air flow 98 is overcooled to remove humidity from the supply air flow 98 before the supply air flow 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, any of the systems illustrated in FIGS. 1-4 may include modulating HVAC equipment, such as a multi-stage or variable capacity compressor, configured to operate in multiple stages of operation (e.g., variable capacities) and a control system (e.g., a controller) configured to enable modulated operation of the modulating HVAC equipment. As previously mentioned, present embodiments enable modulated operation of a variable capacity compressor that is incorporated with an HVAC system having an air handler (e.g., indoor unit) and/or a thermostat that is not configured to provide certain information (e.g., a detected temperature of a conditioned space) that may otherwise enable modulated operation of the variable capacity compressor. For example, the air handler and/or thermostat may be a non-communicating or conventional embodiment that is configured to output limited control signals. Control systems and methods utilizing the present techniques are nevertheless configured to enable modulated operation of the compressor without the information typically provided by a communicating air handler and/or communicating thermostat. For example, the presently disclosed techniques enable modulated operation of a compressor based on a demand or load (e.g., cooling load) on the HVAC system. In some embodiments, the control system may be configured to enable modulated operation of the compressor based on a measured outdoor or ambient temperature. The control system may additionally or alternatively establish and adjust (e.g., iteratively adjust) one or more target operating parameters of the compressor (e.g., a target suction pressure) to enable modulated operation of the compressor. In this way, the presently disclosed techniques enable more efficient operation of the HVAC system having different types (e.g., communicating, non-communicating) HVAC equipment. It should be appreciated that the techniques described herein may be incorporated with HVAC systems configured as air conditioning systems, heat pumps, and/or any other suitable HVAC system having HVAC equipment configured for modulated operation and HVAC equipment that is not configured for modulated operation, such as non-communicating air handlers and/or non-communicating thermostats.

Figure 5:
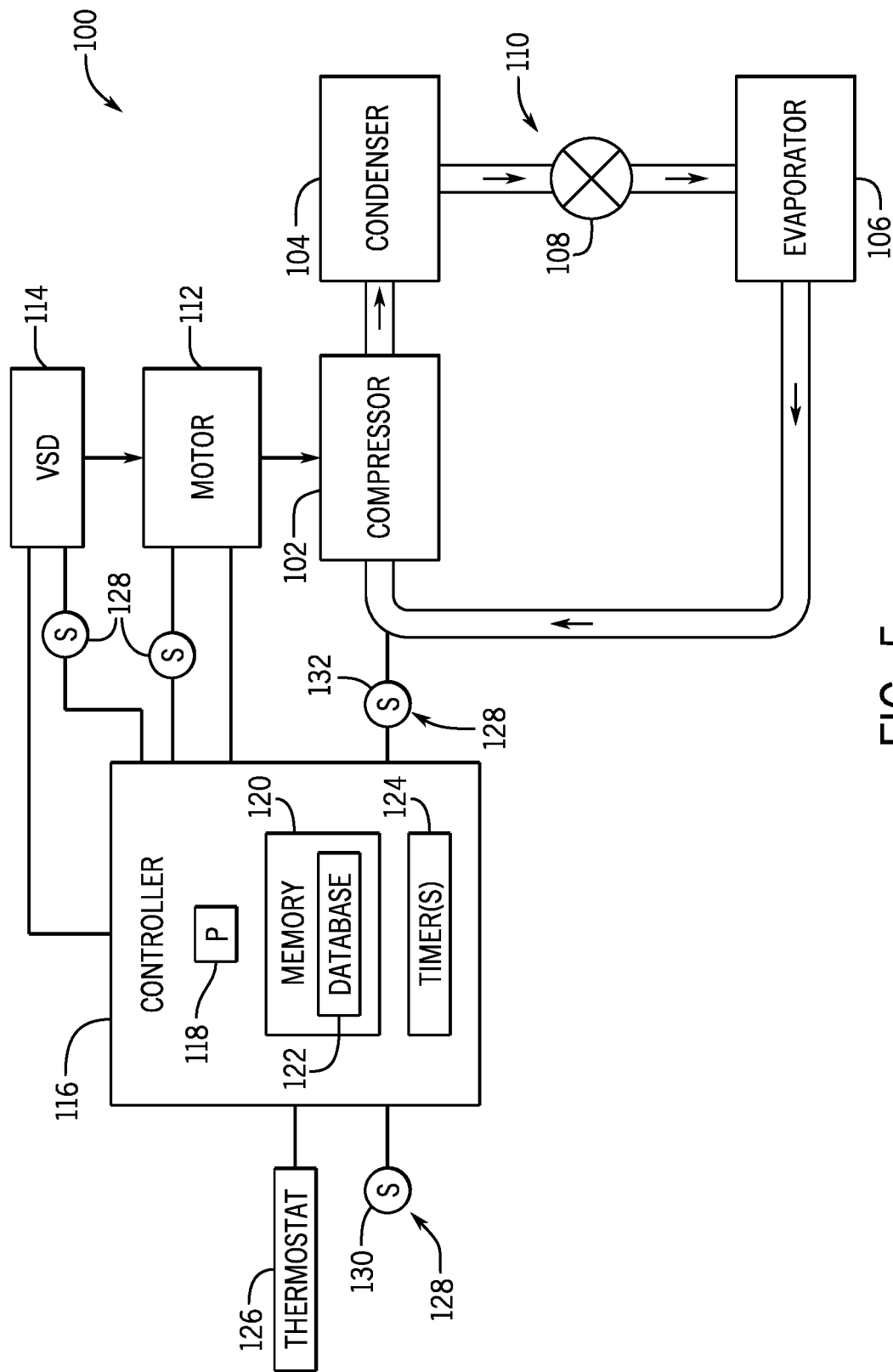
FIG. 5 is a schematic of an embodiment of an HVAC system having a controller configured to modulate operation of a compressor of the HVAC system, in accordance with an aspect of the present disclosure.

To provide context for the following discussion, FIG. 5 is a schematic of an embodiment of an HVAC system 100, which may be incorporated any of the systems or units illustrated in FIGS. 1-4 or any other suitable HVAC system. The HVAC system 100 includes certain elements similar to those discussed above, including a compressor 102, a condenser 104, an evaporator 106, and an expansion device 108 (e.g., expansion valve, electronic expansion valve) disposed along a working fluid circuit 110 (e.g., vapor compression circuit) of the HVAC system 100. The HVAC system 100 may circulate a working fluid, such as a refrigerant, through the working fluid circuit 110 to enable conditioning (e.g., cooling) of an air flow supplied to a conditioned space in order to condition the space.

The compressor 102 is a variable capacity compressor (e.g., a variable speed compressor). To this end, the HVAC system 100 also includes a motor 112 and a VSD 114 configured to enable operation of the compressor 102 at various capacities or speeds. For example, the VSD 114 may be a variable frequency drive configured to vary an input voltage and/or frequency supplied to the motor 112 to enable variable speed operation of the motor 112 and the compressor 102. It should be appreciated that the motor 112 and/or the VSD 114 may be considered components of the compressor 102 throughout the following discussion.

In some embodiments, the HVAC system 100 may be configured as a split system, such as the residential heating and cooling system 50 described above. For example, the compressor 102 and the condenser 104 may be packaged in an outdoor unit (e.g., outdoor unit 58), and the evaporator 106 may be packaged in an indoor unit (e.g., indoor unit 56). However, in other embodiments, the HVAC system 100 may be configured as a packaged system or unit.

In accordance with present techniques, the compressor 102 may be controlled to enable more efficient operation of the HVAC system 100. For example, operation of compressor 102 may be modulated to provide variable capacity operation of the compressor 102. The compressor 102 may be controlled based on an operating mode of the HVAC system 100, based on operating conditions or parameters of the HVAC system 100, based on a load or demand on the HVAC system 100, and/or based on other suitable factors. Indeed, present techniques further enable modulated operation of the compressor 102 with conventional or non-communicating components that may be incorporated with the HVAC system 100 and may not be configured to provide data and/or information that is traditionally utilized to enable modulated operation of compressors.

To this end, the HVAC system 100 includes a controller 116 (e.g., a control system, a control panel, control circuitry) that is communicatively coupled to one or more components of the HVAC system 100 (e.g., compressor 102, motor 112, VSD 114) and is configured to monitor, adjust, and/or otherwise control operation of the components of the HVAC system 100. For example, one or more control transfer devices, such as wires, cables, wireless communication devices, and the like, may communicatively couple the compressor 102, the motor 112, the VSD 114, and/or any other suitable components of the HVAC system 100 to the controller 116. That is, the compressor 102, the motor 112, and/or the VSD 114 may each have one or more communication components that facilitate wired or wireless (e.g., via a network) communication with the controller 116. In some embodiments, the communication components may include a network interface that enables the components of the HVAC system 100 to communicate via various protocols such as EtherNet/IP, ControlNet, DeviceNet, or any other communication network protocol. Alternatively, the communication components may enable the components of the HVAC system 100 to communicate via mobile telecommunications technology, Bluetooth®, near-field communications technology, and the like. As such, the compressor 102, the motor 112, and/or the VSD 114 may wirelessly communicate data between each other. In other embodiments, operational control of certain components of the HVAC system 100 may be regulated by one or more relays or switches (e.g., a 24 volt alternating current [VAC] relay).

In some embodiments, the controller 116 may be a component of or may include the control panel 82. In other embodiments, the controller 116 may be a standalone controller, a dedicated controller, a group of controllers, multiple, separate controllers, an outdoor unit controller packaged with the compressor 102, or another suitable controller included in the HVAC system 100. In any case, the controller 116 is configured to control components of the HVAC system 100 in accordance with the techniques discussed herein. The controller 116 includes processing circuitry 118, such as a microprocessor, which may execute software for controlling the components of the HVAC system 100. The processing circuitry 118 may include multiple microprocessors, one or more "general-purpose" microprocessors, one or more special-purpose microprocessors, and/or one or more application specific integrated circuits (ASICS), or some combination thereof. For example, the processing circuitry 118 may include one or more reduced instruction set (RISC) processors.

The controller 116 may also include a memory device 120 (e.g., a memory) that may store information, such as executable instructions, control software, look up tables, configuration data, etc. The memory device 120 may include a volatile memory, such as random access memory (RAM), and/or a nonvolatile memory, such as read-only memory (ROM). The memory device 120 may store a variety of information and may be used for various purposes. For example, the memory device 120 may store processor-executable instructions including firmware or software for the processing circuitry 118 to execute, such as instructions for controlling components of the HVAC system 100 (e.g., compressor 102, motor 112, VSD 114). Indeed, it should be appreciated that the memory device 120 may include executable instructions for performing any of the techniques disclosed herein. In some embodiments, the memory device 120 is a tangible, non-transitory, machine-readable-medium that may store machine-readable instructions for the processing circuitry 118 to execute. The memory device 120 may include ROM, flash memory, a hard drive, or any other suitable optical, magnetic, or solid-state storage medium, or a combination thereof. The memory device 120 may store data, instructions, and any other suitable data. For example, the memory device 120 may include a database 122 configured to store one or more reference values, operating parameter values, calculated values, historical values, and/or any other suitable data to enable operation of the HVAC system 100 in accordance with the presently disclosed techniques.

In some embodiments, the controller 116 may include one or more timers 124 (e.g., one or more clocks). For example, the controller 116 may include executable instructions stored on the memory device 120, and the processing circuitry 118 may be configured to execute the executable instructions to operate one or more of the timers 124 to enable monitoring and/or tracking of one or more time durations associated with operations of the HVAC system 100 utilizing the present techniques, as described in greater detail below. In some embodiments, time durations and/or time duration thresholds associated with the one or more timers 124 may be stored in the memory device 120, such as in the database 122.

The controller 116 may also be coupled to one or more additional control components of the HVAC system 100. For example, in the illustrated embodiment, the controller 116 is communicatively coupled to a thermostat 126. As will be appreciated, the thermostat 126 may be associated with a space conditioned by the HVAC system 100 and may be configured to receive a user input corresponding to an operating parameter set point (e.g., temperature set point). Based on the user input, the thermostat 126 may output a call for conditioning (e.g., a call for cooling, 24 volt signal, electrical signal), and the call for conditioning may be received by the controller 116. For example, the thermostat 126 may be disposed within a space conditioned by the HVAC system 100, and the controller 116 may be disposed within an enclosure or unit having the compressor 102 (e.g., outdoor unit 58). However, the thermostat 126 may be a conventional or non-communicating thermostat, in some embodiments, and may not be configured to provide data or information typically referenced and utilized to enable modulated operation of the compressor 102. For example, the thermostat 126 may not be configured to collect and/or transmit data indicative of a measured temperature within the conditioned space to the controller 116. In some embodiments, the controller 116 may additionally or alternatively be communicatively coupled to an air handler controller (e.g., controller of indoor unit 56) having similar capability limitations as the thermostat 126. That is, the controller 116 may be communicatively coupled to a conventional or non-communicating air handler controller. Nevertheless, the controller 116 incorporating the presently disclosed techniques is configured to enable modulated operation of the compressor 102 to satisfy a call for conditioning received from the thermostat 126. For example, the controller 116 may be configured to determine and establish a desired operating parameter (e.g., suction pressure) according to which the HVAC system 100 (e.g., compressor 102) may operate. More specifically, the controller 116 may be configured to determine, establish, and adjust a variable target operating parameter and enable operation (e.g., modulated operation) of the compressor 102 to approach and/or reach the target operating parameter. It should be appreciated that the disclosed techniques may also be utilized in embodiments of the HVAC system 100 in which the thermostat 126 is a communicating thermostat.

The controller 116 is also communicatively coupled to one or more sensors 128 of the HVAC system 100. The one or more sensors 128 are configured to detect one or more operating parameters of the HVAC system 100 and provide feedback and/or data indicative of the operating parameters to the controller 116. For example, a first sensor 130 of the one or more sensors 128 may be an outdoor or ambient temperature sensor configured to detect or measure a temperature of an ambient environment surrounding the HVAC system 100. As another example, a second sensor 132 of the one or more sensors 128 may be a working fluid sensor configured to measure or detect an operating parameter (e.g., temperature, pressure) of the working fluid circulated through the working fluid circuit 110. In some embodiments, the second sensor 132 may be disposed along the working fluid circuit 110 upstream of the compressor 102 relative to a flow direction of the working fluid through the working fluid circuit 110 and may be configured to detect a suction pressure of the working fluid entering the compressor 102. The one or more sensors 128 may additionally or alternatively include other sensors, such as sensors configured to detect one or more operating parameters of the compressor 102, the motor 112, the VSD 114, and/or other components of the HVAC system 100. As described in further detail below, the controller 116 may utilize data and/or feedback received from the one or more sensors 128 to enable modulated operation of the compressor 102 in accordance with present techniques.

Figure 6:
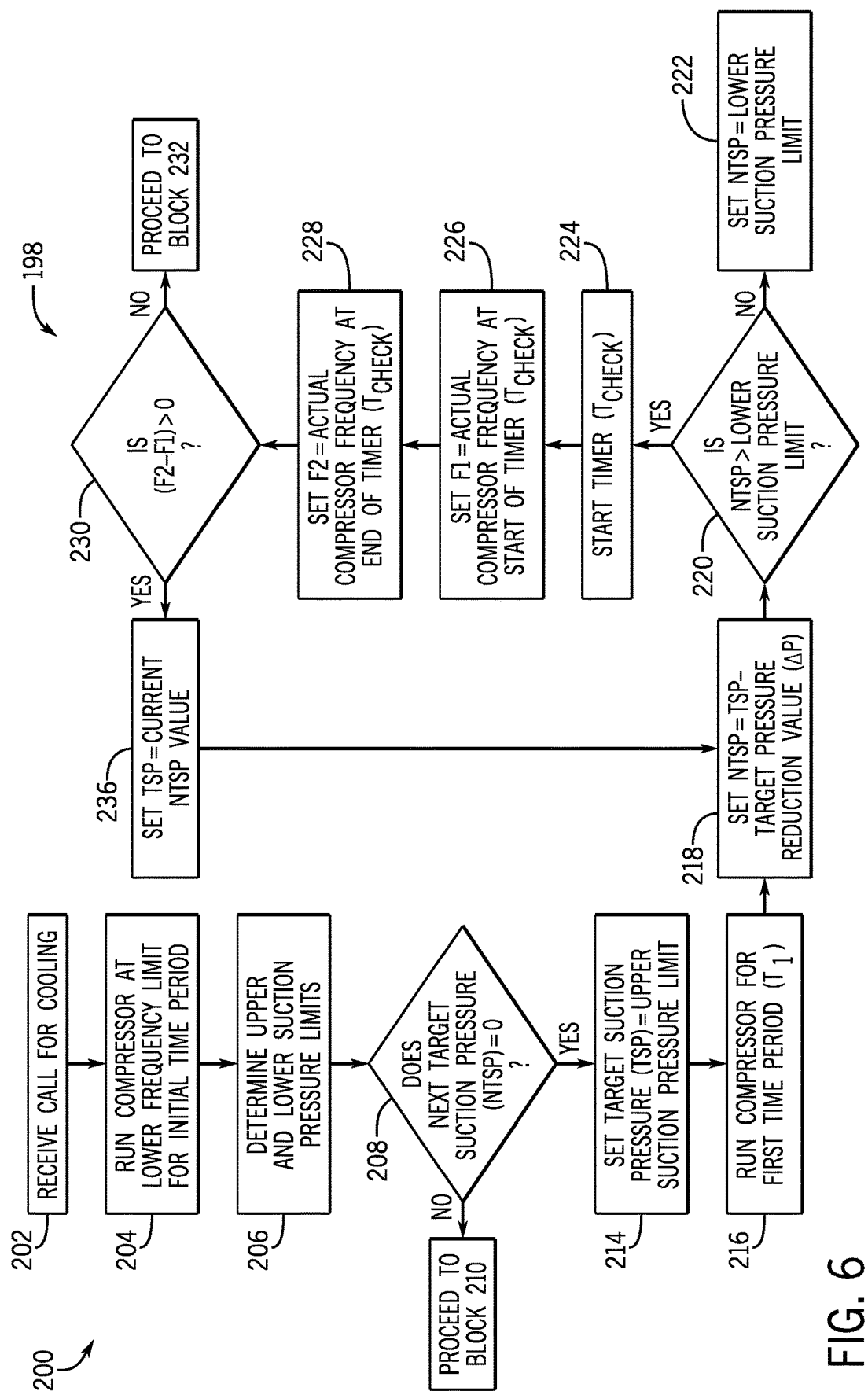
FIG. 6 is a process flow diagram of an embodiment of a method for controlling operation of an HVAC system, in accordance with an aspect of the present disclosure.

With the foregoing in mind, FIG. 6 is a process flow diagram of an embodiment of a method 198 (e.g., control sequence, one or more control sequences, algorithm) for operating the HVAC system 100 (e.g., the compressor 102) and to enable modulated operation of the compressor 102 (e.g., in a cooling mode of the HVAC system 100). In this way, the method 198 enables more efficient operation of the HVAC system 100. As will be appreciated, the method 198 may be performed by the controller 116 (e.g., outdoor unit controller, compressor controller, one or more controllers). For example, computer-executable instructions or code for performing the method 198 may be stored on the memory device 120, and the processing circuitry 118 may execute the instructions to perform the method 198. In some embodiments, one or more steps of the method 198 may be performed by another controller of the HVAC system 100 and/or by a controller remote from the HVAC system 100. In additional or alternative embodiments, multiple components or systems may perform the steps of the method 198. It should also be noted that additional steps may be performed with respect to the depicted method 198. Moreover, certain steps of the method 198 may be removed, modified, and/or performed in a different order. In some embodiments, certain steps of the method 198 may not be performed based on a configuration of the HVAC system 100, such as based on a configuration of the compressor 102. Further still, the steps of the method 198 may be performed in any suitable relation with one another, such as in response to one another and/or in parallel with one another. In some implementations, the method 198 may include multiple control schemes (e.g., loops, branches, portions, etc.). For example, the illustrated embodiment depicts an embodiment of a first control scheme 200 of the method 198. Additional embodiments of control schemes of the method 198 are described in further detail below.

At block 202, a call for cooling is received. For example, the controller 116 may receive the call for cooling from the thermostat 126. As mentioned above, the call for cooling may be output by the thermostat 126 and may be received by the controller 116 as a 24-volt electrical signal (e.g., a signal configured to initiate operation of the compressor 102). However, as the thermostat 126 may be a conventional or non-communicating thermostat, the call for cooling may not include data typically provided by communicating thermostats (e.g., data indicative of a measured temperature within the conditioned space). In some embodiments, the call for cooling may be transmitted to the controller 116 by another system or controller of the HVAC system 100, such as a non-communicating or conventional indoor unit or air handler controller.

In response to receipt of the call for cooling, the controller 116 may operate the compressor 102 at a lower frequency limit (e.g., minimum allowable frequency, minimum allowable capacity, lower capacity limit) for an initial time period (e.g., duration of time, threshold time period), as indicated by block 204. For example, the lower frequency limit may be a minimum allowable frequency at which the compressor 102 may be operated. In some embodiments, the lower frequency limit may be determined based on regulatory standards, target or desired operating (e.g., efficiency) metrics, and/or other restrictions or parameters. Additionally or alternatively, the lower frequency limit may be determined based on a type of the compressor 102, a model of the compressor 102, a capacity of the compressor 102, a capacity of the HVAC system 100, another characteristic of the HVAC system 100, or any combination thereof. In some embodiments, the controller 116 may output one or more control signals to the VSD 114, the motor 112, the compressor 102, or any combination thereof to enable operation of the compressor 102 at the lower frequency limit. Further, the controller 116 may monitor or track operation of the compressor 102 at the lower frequency limit for the initial time period utilizing one or more of the timers 124 (e.g., a first timer). In some embodiments, the initial time period may be a predetermined, constant, and/or fixed period or duration of time. For example, the initial time period may be approximately 3 minutes, 4 minutes, 5 minutes, 6 minutes, or any other suitable period of time.

Upon a determination that the initial time period has lapsed (e.g., as indicated by the timer 124), the controller 116 may determine an upper suction pressure limit and a lower suction pressure limit within which the compressor 102 and/or HVAC system 100 is to be operated during the operating cycle of the HVAC system 100, as indicated by block 206. That is, the controller 116 may determine upper and lower suction pressure limits to be referenced as operational boundaries during operation of the compressor 102 and the HVAC system 100 to satisfy the call for cooling received at block 202. The upper and lower suction pressure limits may be determined in any suitable manner. In some embodiments, the upper suction pressure limit and/or the lower suction pressure limit may be determined and/or selected based on predetermined values stored in the memory device 120. Additionally or alternatively, the upper suction pressure limit and/or the lower suction pressure limit may be determined based on one or more equations that may be stored in the memory device 120. The one or more equations may utilize any suitable inputs to enable calculation of the upper suction pressure limit and/or the lower suction pressure limit. For example, empirical data, test data, regulatory parameters, operating parameters, constant values, predetermined parameters, and/or any other suitable input. As discussed in further detail below, in some embodiments, the upper suction pressure limit and/or the lower suction pressure limit may be determined in different manners, such as based on a detected operating parameter or characteristic of the HVAC system 100 (e.g., based on a measured ambient temperature).

Once the upper suction pressure limit and the lower suction pressure limit are determined (e.g., by the controller 116), the method 198 may proceed to block 208. At block 208, the controller 116, for example, may determine whether a Next Target Suction Pressure (NTSP) value (e.g., stored target suction pressure value, future target suction pressure value, subsequent target suction pressure value, expected target suction pressure value) of the HVAC system 100 equals zero (e.g., null). For example, the memory device 120 (e.g., database 122) may be configured to store an NTSP value associated with the HVAC system 100. In some embodiments, the NTSP value stored on the memory device 120 may be a non-zero value and may be associated with a previous operating cycle (e.g., cooling cycle) of the HVAC system 100, such as most recent operating or cooling cycle of the HVAC system 100 prior to receipt of the call for cooling at block 202. For example, the NTSP value stored in the memory device 120 may be the last NTSP value determined or established by the controller 116 during the most recent operating cycle. In some embodiments, the NTSP value may be reset to zero (e.g., in the memory device 120 and/or database 122) in response to an interruption in supply of power to the HVAC system 100 and/or in response to a hard reset of the HVAC system 100.

Based on a determination (e.g., via the controller 116) that the NTSP value does not equal zero at block 208, the method 198 may proceed to block 210 of a third control scheme 212 of the method 198. The third control scheme 212, including block 210, is described in further detail below with reference to FIG. 8. Based on a determination (e.g., via the controller 116) that the NTSP value (e.g., stored in the memory device 120) equals zero at block 208 (e.g., resulting from a hard reset of the HVAC system 100 or upon a new installation of the HVAC system 100), the method 198 may proceed to block 214 of the first control scheme 200 of the method 198. At block 214, the controller 116 may set (e.g., designate, establish) the upper suction pressure limit determined at block 206 as a Target Suction Pressure (TSP) (e.g., TSP value, suction pressure set point) of the HVAC system 100. The TSP value may be stored in the memory device 120, in some embodiments. In general, with the TSP established, the HVAC system 100 may be operated to achieve the TSP. That is, operation of one or more components of the HVAC system 100, such as the compressor 102, may be adjusted or modified (e.g., during the cooling mode) to cause a measured suction pressure of the HVAC system 100 to approach and/or reach the TSP. As will be appreciated, the suction pressure may correspond to a pressure of the working fluid entering a suction side or inlet of the compressor 102. Thus, in order to achieve the TSP, the controller 116 may be configured to adjust operation of the compressor 102 based on feedback received from one or more of the sensors 128, such as the second sensor 132 disposed along the working fluid circuit 110. The second sensor 132 may be configured to detect a suction pressure of the working fluid entering the compressor 102. In some embodiments, the controller 116 may be configured to adjust an operating parameter of the compressor 102, the motor 112, and/or the VSD 114 based on the data and/or feedback received from the second sensor 132. In this way, the controller 116 may modulate operation of the compressor 102 to cause the measured suction pressure to approach and/or reach the TSP.

Next, at block 216, the compressor 102 may be operated for a first time period (Ti). As similarly discussed above, the first time period may be monitored or tracked based on operation of one or more of the timers 124 (e.g., a second timer) of the controller 116. The first time period may be any suitable time period. For example, the first time period may be a predetermined or fixed value (e.g., 3 minutes, 4 minutes, 5 minutes, 6 minutes, etc.), which may be stored in the memory device 120 and/or the database 122. During the first time period, the controller 116 may operate the HVAC system 100 and/or may adjust operation of the HVAC system 100 (e.g., the compressor 102) to cause the suction pressure of the working fluid detected by the second sensor 132 to approach the TSP established at block 214. In some embodiments, the controller 116 may be configured to adjust a voltage and/or frequency applied to the motor 112 by the VSD 114 to cause a change in the suction pressure of the working fluid circuit 110.

Upon lapse of the first time period (e.g., as determined by one of the timers 124), the method 198 may proceed to block 218. At block 218, the controller 116 may set (e.g., establish) the NTSP as an updated value (e.g., future TSP value, subsequent TSP value, expected TSP value). The updated or new value of the NTSP may be determined by subtracting a differential pressure value ($\Delta P$) (e.g., increment, predetermined value, fixed value, first differential pressure value) from the TSP (e.g., current TSP) designated at block 214. The differential pressure value may be a target pressure reduction value. In some embodiments, the differential pressure value may be stored in the memory device 120 (e.g., database 122) and may be referenced by the controller 116 to perform the step at block 218. The differential pressure value may be any suitable value having any suitable units (e.g., 0.005 Megapascals [MPa], 0.01 MPa, 0.015 MPa, or any other suitable value). The updated value of the NTSP may be stored in the memory device 120 and/or database 122. In accordance with present techniques, the NTSP is therefore decreased or reduced at block 218.

After the NTSP value (e.g., future TSP value, subsequent TSP value, expected TSP value) is updated at block 218, the method 198 may proceed to block 220. At block 220, the controller 116, for example, may determine whether the NTSP value established or updated at block 218 is greater than the lower suction pressure limit determined at block 206. Based on a determination that the NTSP is not greater than the lower suction pressure limit, the lower suction pressure limit may be established as the NTSP, as indicated by block 222. In other words, the controller 116 may update or adjust the NTSP to be equal to the lower suction pressure limit. The NTSP updated as the lower suction pressure limit may be stored in the memory device 120, and the controller 116 may continue to operate the HVAC system 100 utilizing the lower suction pressure limit as the NTSP for a remaining duration of the cooling cycle of the HVAC system 100. That is, the controller 116 may operate and/or adjust operation of the HVAC system 100 (e.g., compressor 102) to cause the measured suction pressure detected by the second sensor 132 to approach and/or reach the existing or current TSP until the call for cooling received at block 202 is satisfied and operation of the HVAC system 100 is suspended. As mentioned above, when operation of the HVAC system 100 is suspended at the end of an operating cycle, the existing or established NTSP at the time of suspended operation may remain stored in the memory device 120 (e.g., database 122) for reference during execution of the method 198 (e.g., block 208) in a subsequent operating cycle (e.g., cooling mode) of the HVAC system 100.

Based on a determination that the NTSP is greater than the lower suction pressure limit at block 220, the method 198 may proceed to block 224. At block 224, the controller 116 may initiate or start a timer ($T_{check}$), which may be one of the timers 124 (e.g., a third timer) of the controller 116. Upon initiation of the timer ($T_{check}$), a frequency (e.g., first frequency, measured frequency, actual frequency, detected frequency, frequency value) of the compressor 102 may be determined, and the frequency value may be established as a first frequency value (e.g., F1), as indicated by block 226. For example, the controller 116 may be configured to receive data and/or feedback from the compressor 102, the motor 112, and/or the VSD 114 indicative of a frequency applied to the compressor 102 (e.g., the motor 112) at the start of the timer ($T_{check}$). In some embodiments, one of the sensors 128 of the HVAC system 100 may be configured to detect the frequency of the compressor 102 and provide data indicative of the frequency to the controller 116 at the start of the timer ($T_{check}$). The first frequency value (F1) may be stored in the memory device 120, in some embodiments.

After the timer ($T_{check}$) runs for a designated time period (e.g., first designated time period), the method 198 proceeds to block 228. At block 228, an additional frequency (e.g., second frequency, measured frequency, actual frequency, detected frequency, frequency value) of the compressor 102 is determined at the end of the timer ($T_{check}$). The additional frequency value may be established as a second frequency value (e.g., F2) and may be stored in the memory device 120. The additional frequency value may be determined in any suitable manner, such as utilizing the techniques described above with reference to block 226. The duration of the timer ($T_{check}$, third timer, timer 124) may be any suitable time period, such as a predetermined or fixed time period (e.g., 90 seconds, 120 seconds, 150 seconds, etc.), which may be stored in the memory device 120.

The method 198 may then proceed to block 230. At block 230, the controller 116 may determine whether a difference between the additional frequency (F2) determined at block 228 and the frequency (F1) determined at block 226 is greater than zero. In other words, the controller 116 may be configured to subtract the frequency (F1) from the additional frequency (F2) at block 230.

Based on a determination that the difference between the additional frequency (F2) and the frequency (F1) is not greater than zero, the method 198 may proceed to block 232 of a second control scheme 234 of the method 198. The second control scheme 234, including block 232, is described in further detail below with reference to FIG. 7. Based on a determination (e.g., via the controller 116) that the difference between the additional frequency (F2) and the frequency (F1) is greater than zero at block 230, the method 198 may proceed to block 236 of the first control scheme 200 of the method 198. At block 236, the TSP (e.g., TSP value, current TSP value) may be set (e.g., updated) based on the current NTSP value. In other words, the current NTSP value may be established as a new or updated value of the TSP. The updated value of the TSP may be stored in the memory device 120. In this way, the TSP value may be decreased or reduced, and the controller 116 may modulate operation of the compressor 102 to cause the measured suction pressure of the working fluid circuit 110 to approach the updated value of the TSP and improve efficiency of the HVAC system 100. Thereafter, the first control scheme 200 of the method 198 may return to block 218, whereby the value of the NTSP may be updated in the manner described above.

In some instances, execution of the first control scheme 200 of the method 198 may include continual (e.g., repeated) execution of the steps at blocks 218, 220, 224, 226, 228, 230, and 236 in a loop or in succession. Thus, the values of the NTSP and the TSP may be iteratively reduced, and the controller 116 may continually adjust operation of the compressor 102 to approach and/or achieve the updated (e.g., reduced) TSP values. In this way, execution of the method 198 enables modulated operation of the compressor 102 during the operating cycle of the HVAC system 100 to satisfy the call for cooling (e.g., based on a load or demand on the HVAC system 100). In particular, operation of the compressor 102 may be modulated without receipt of certain data (e.g., measured temperatures of the conditioned space) that would typically be provided by a communicating thermostat. The disclosed techniques therefore enable more efficient operation of the HVAC system 100 with the thermostat 126 (e.g., non-communicating thermostat) and/or other non-communicating HVAC equipment included in the HVAC system 100.

Figure 7:
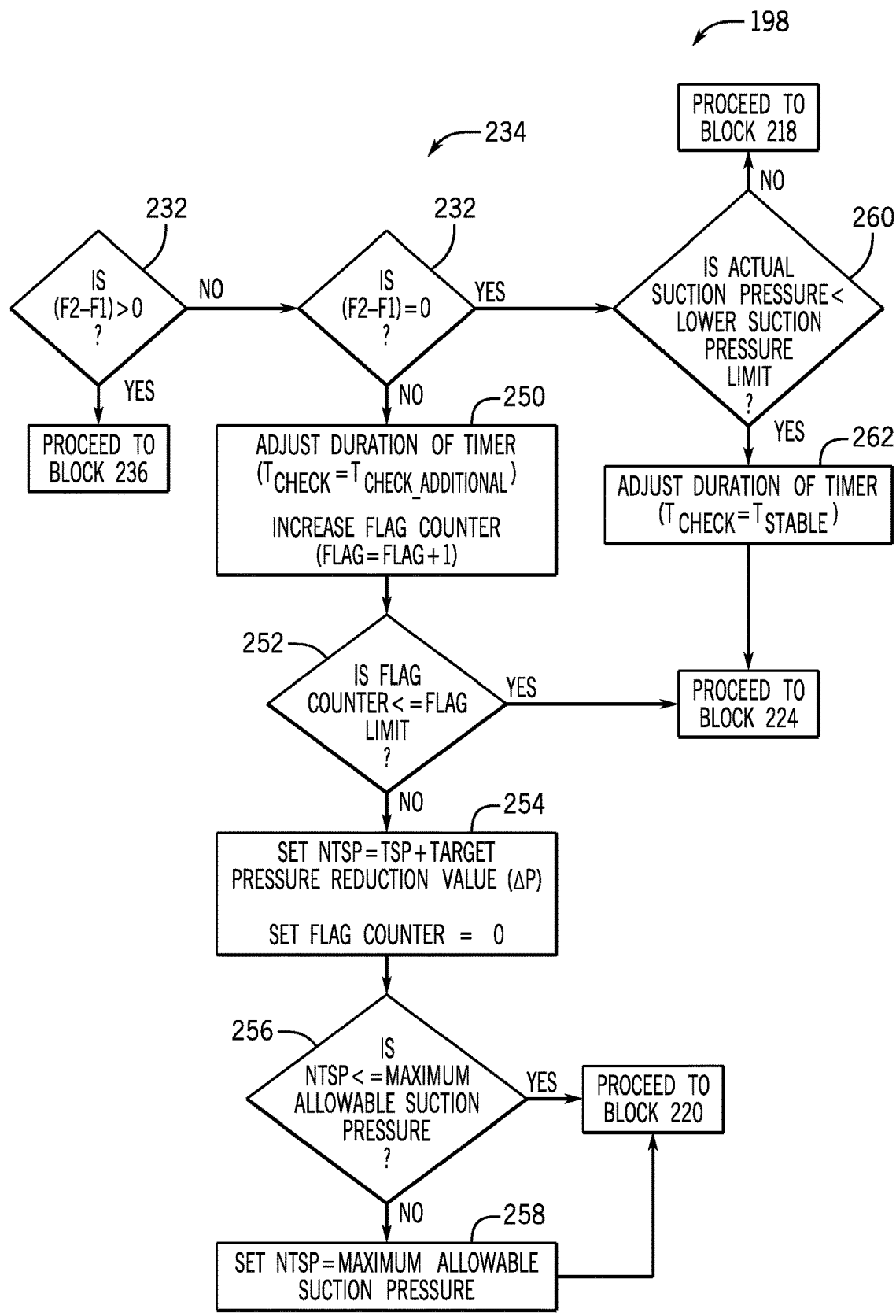
FIG. 7 is a process flow diagram of an embodiment of a method for controlling operation of an HVAC system, in accordance with an aspect of the present disclosure.

FIG. 7 is a process flow diagram of an embodiment of the method 198 (e.g., control sequence, one or more control sequences) for operating the HVAC system 100 (e.g., the compressor 102) to enable modulated operation of the compressor 102 and thereby enable more efficient operation of the HVAC system 100. In particular, the illustrated embodiment depicts an embodiment of the second control scheme 234 of the method 198. As discussed above, the method 198 includes block 230, whereby the controller 116 may determine whether a difference between the additional frequency (F2) and the frequency (F1) determined at block 230 is greater than zero.

Based on a determination that the difference between the additional frequency (F2) and the frequency (F1) is not greater than zero, the method 198 may proceed to block 232. At block 232, the controller 116 may determine whether the difference between the additional frequency (F2) and the frequency (F1) is equal to zero. In response to a determination that the difference between the additional frequency (F2) and the frequency (F1) is not equal to zero (e.g., is less than zero), the method 198 may proceed to block 250. At block 250, a duration of the timer ($T_{check}$) discussed above with reference to blocks 224, 226, and 228 may be adjusted. For example, the duration of the timer ($T_{check}$) may be adjusted from the first duration of time utilized in the first control scheme 200 to a second duration of time. In some embodiments, the second duration of time may be greater or longer than the first duration of time. For example, the first duration of time may be approximately 120 seconds, and the second duration of time may be approximately 150 seconds, 180 seconds, 210 seconds, or another suitable duration of time that is greater than the first duration of time. The updated duration of time of the timer (e.g., timer 124, third timer) may be stored in the memory device 120 and/or the database 122 (e.g., $T_{check\_additional}$). Also at block 250, a flag counter of the HVAC system 100 (e.g., the controller 116) may be increased or incremented (e.g., by one unit or count). For example, the flag counter may be a metric or other data stored in the memory device 120 and/or the database 122. Thus, at block 250, the count, metric, or other value associated with the flag counter and stored in the memory device 120 may be updated, such as increased by one, and the updated value may be stored in the memory device 120.

Thereafter, the method 198 may proceed to block 252. At block 252, the flag counter (e.g., a value of the flag counter) may be compared to a flag limit. Similar to the flag counter, a value of the flag limit may be stored in the memory device 120 and/or the database 122. The value of the flag limit may be a predetermined and/or fixed value, such as an integer (e.g., 2, 3, etc.). The controller 116 may reference the value of the flag counter and the value of the flag limit stored in the memory device 120 to make the determination at block 252. In response to a determination that the flag counter is less than or equal to the flag limit, the method 198 may proceed to block 224 of the first control scheme 200 discussed above with reference to FIG. 6. From block 224, the method 198 may continue (e.g., resume) operation of the first control scheme 200 in the manner discussed above. However, it should be noted that the continued operation of first control scheme 200 may utilize the timer ($T_{check\_additional}$) instead of the timer ($T_{check}$) based on the time duration adjustment performed at block 250. Thus, operation of the method 198 (e.g., execution of blocks 224, 226, and 228) may extend a greater length of time. The lapse of a greater length of time during execution of blocks 224, 226, and 228 may enable increased stabilization in operating parameters of the HVAC system 100 (e.g., working fluid suction pressure), in some embodiments. For example, the increased length of time may enable the HVAC system 100 to more adequately or completely detect and/or assess operating parameters of the HVAC system 100, such as a load or demand (e.g., cooling load) on the HVAC system 100.

In response to a determination that the flag counter is not less than or equal to (e.g., is greater than) the flag limit, the method 198 may proceed to block 254. At block 254, the controller 116 may set (e.g., establish) the NTSP (e.g., future TSP value, subsequent TSP value, expected TSP value) as an updated value. The updated or new value of the NTSP may be determined by adding the differential pressure value (ΔP) (e.g., increment, predetermined value, fixed value, first differential pressure value) discussed above to the TSP (e.g., current TSP, designated at block 214). The updated value of the NTSP may be stored in the memory device 120 for reference during later operation of the method 198 (e.g., during a current operating cycle of the HVAC system 100, during a subsequent operating cycle of the HVAC system 100). Additionally, at block 254, a value of the flag counter (e.g., stored in the memory device 120 and/or database 122) may be reset to a value of zero.

From block 254, the method 198 may continue to block 256, whereby the NTSP (e.g., updated NTSP value determined at block 254) may be compared to a maximum allowable suction pressure value. For example, the controller 116 may be configured to compare the NTSP to the maximum allowable suction pressure value. The maximum allowable suction pressure value may also be a value stored in the memory device 120 and/or database 122. In some embodiments, the maximum allowable suction pressure value may be a predetermined value that is designated based on any suitable parameters or factors, such as a type of the compressor 102, a capacity of the compressor 102, a configuration of the HVAC system 100, other operating conditions or limits of the HVAC system 100, testing data, empirical data, regulatory standards, target or desired operating (e.g., efficiency) metrics, or any combination thereof.

In response to a determination that the NTSP (e.g., future TSP value, subsequent TSP value, expected TSP value) is less than or equal to the maximum allowable suction pressure value, the method 198 may proceed to block 220 of the first control scheme 200 discussed above with reference to FIG. 6. From block 220, the method 198 may continue (e.g., resume) operation of the first control scheme 200 in the manner discussed above. In response to a determination that the NTSP is not less than or equal to (e.g., is greater than) the maximum allowable suction pressure, the method 198 may proceed to block 258. At block 258, the maximum allowable suction pressure may be set or established as the NTSP. For example, the controller 116 may store a value of the maximum allowable suction pressure as the NTSP in the memory device 120 and/or database 122. In this way, operation of the HVAC system 100 at working fluid suction pressures greater than the maximum allowable suction pressure may be avoided. From block 258, the method 198 may proceed to block 220 of the first control scheme 200 discussed above.

Returning to block 232, in response to a determination that the difference between the additional frequency (F2) and the frequency (F1) is equal to zero, the method 198 may proceed to block 260. At block 260, an actual suction pressure of the HVAC system 100 may be compared to the lower suction pressure limit (e.g., determined at block 206). For example, the controller 116 may receive feedback from the second sensor 132 indicative of a detected (e.g., current, actual) working fluid suction pressure upstream of the compressor 102, and the controller 116 may compare the measured working fluid suction pressure to the lower suction pressure limit, which may be stored in the memory device 120. In particular, the controller 116 may determine whether the measured working fluid suction pressure is less than the lower suction pressure limit.

In response to a determination that the measured working fluid suction pressure is not less than the lower suction pressure limit, the method 198 may proceed to block 218 of the first control scheme 200 discussed above with reference to FIG. 6. From block 218, the method 198 may continue (e.g., resume) operation of the first control scheme 200 in the manner discussed above. In response to a determination that the measured working fluid suction pressure is less than the lower suction pressure limit, the method 198 may proceed to block 262. At block 262, a duration of the timer ($T_{check}$)

discussed above with reference to blocks 224, 226, and 228 may be adjusted. For example, the duration of the timer ($T_{check}$) may be adjusted from the first duration of time utilized in the first control scheme 200 to a third duration of time (e.g., different from the second duration of time discussed above). In some embodiments, the third duration of time may be greater or longer than the first duration of time and greater or longer than the second duration of time. For example, the third duration of time may be approximately 500 seconds, 550 seconds, 600 seconds, 650 seconds, or another suitable duration of time that is greater than the first duration of time and the second duration of time. The updated duration of time of the timer (e.g., timer 124, third timer) may be stored in the memory device 120 and/or the database 122 (e.g., $T_{stable}$).

After block 262, the method 198 may proceed to block 224 of the first control scheme 200 discussed above with reference to FIG. 6. From block 224, the method 198 may continue (e.g., resume) operation of the first control scheme 200 in the manner discussed above. As similarly discussed above, the continued operation of first control scheme 200 may utilize the timer ($T_{stable}$) instead of the timer ($T_{check}$). Thus, operation of the method 198 (e.g., execution of blocks 224, 226, and 228) may extend a greater length of time. The lapse of a greater length of time during execution of blocks 224, 226, and 228 may enable extended operation of the compressor 102 according to a particular TSP in instances when the additional frequency (F2) at the end of the timer (e.g., block 228) is not greater than and the frequency (F1) at the start of the timer (e.g., block 226). For example, an unexpected change in operating conditions of the HVAC system 100 (e.g., a decrease in ambient temperature) may cause a change in operating parameters of the HVAC system 100, and the increased length of time may enable stabilization of the operating parameters and/or conditions of the HVAC system 100.

Figure 8:
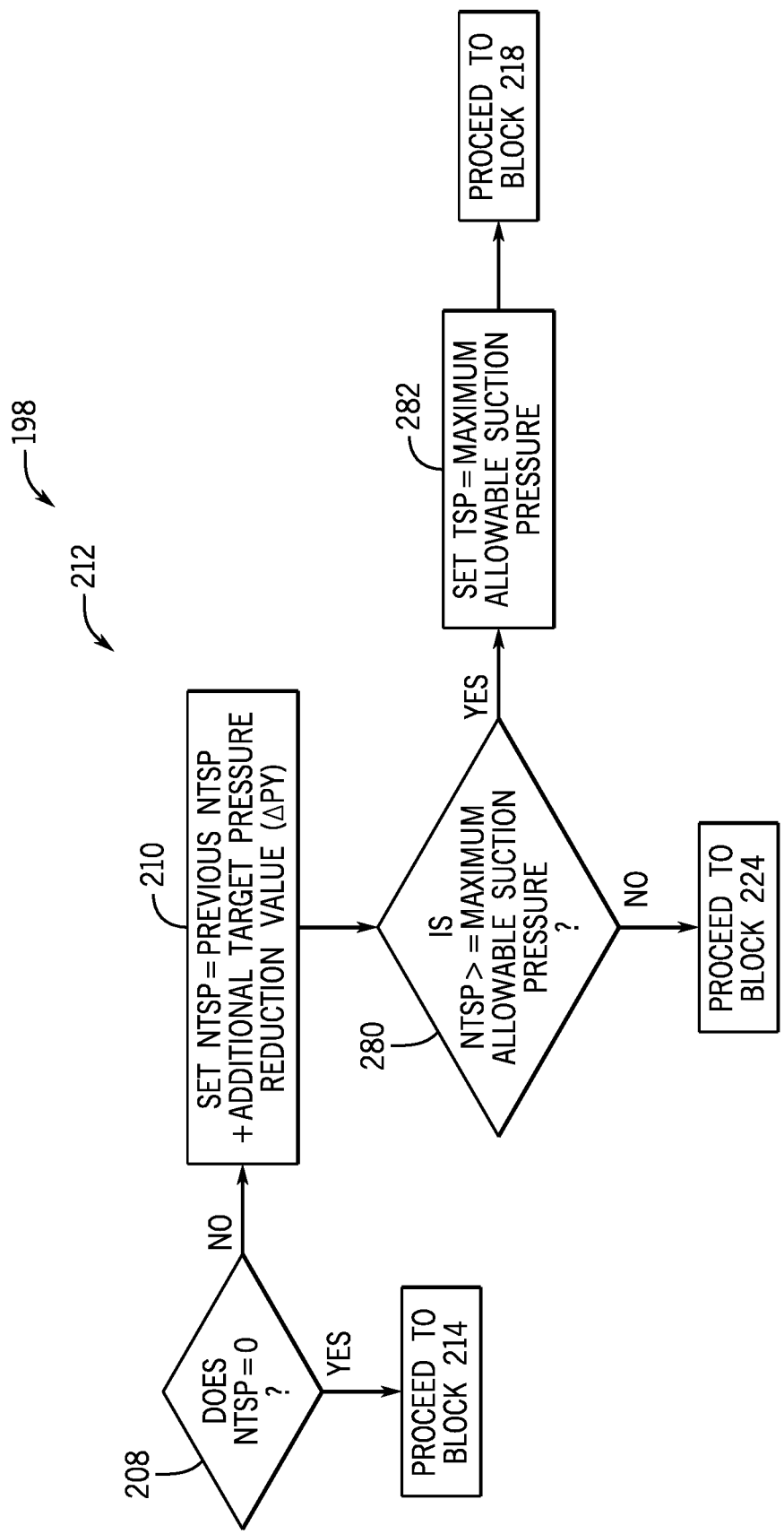
FIG. 8 is a process flow diagram of an embodiment of a method for controlling operation of an HVAC system, in accordance with an aspect of the present disclosure.

FIG. 8 is a process flow diagram of an embodiment of the method 198 (e.g., control sequence, one or more control sequences) for operating the HVAC system 100 (e.g., the compressor 102) to enable modulated operation of the compressor 102 and thereby enable more efficient operation of the HVAC system 100. In particular, the illustrated embodiment depicts an embodiment of the third control scheme 212 of the method 198. As discussed above, the method 198 includes block 208, whereby the controller 116 may determine whether an NTSP value (e.g., future TSP value, subsequent TSP value, expected TSP value) of the HVAC system 100 equals zero. The NTSP value may be stored in the memory device 120 and/or the database 122 and may be referenced by the controller 116 at block 208. In some instances, the NTSP value may be a value (e.g., a non-zero value) stored in the memory device 120 and may be associated with a previous (e.g., most recent) operating cycle of the HVAC system. For example, the NTSP value referenced at block 208 may be the last NTSP value determined by the HVAC system 100 during a most recent operating cycle. In other instances, the NTSP value may have a value of zero. For example, the NTSP may have a value of zero subsequent to a power interruption to the HVAC system 100 and/or subsequent to a hard reset of the HVAC system 100.

Based on a determination (e.g., via the controller 116) that the NTSP value does not equal zero at block 208, the method 198 may proceed to block 210. At block 210, the controller 116 may set (e.g., establish) an updated value as the NTSP. The updated or new value of the NTSP may be determined by adding an additional differential pressure value ($\Delta Py$) (e.g., additional increment, additional predetermined value, additional fixed value, second differential pressure value) to the NTSP (e.g., previous NTSP, most recent NTSP) stored in the memory device 120. The additional differential pressure value may be an additional target pressure reduction value. In some embodiments, the additional differential pressure value may be stored in the memory device 120 (e.g., database 122) and may be referenced by the controller 116 to perform the step at block 210.

Additionally, the additional differential pressure value ($\Delta Py$) may be greater than the differential pressure value ($\Delta P$) discussed above with respect to block 218. The additional differential pressure value may be any suitable value having any suitable units (e.g., 0.02 MPa, 0.03 MPa, 0.04 MPa, or any other suitable value). The additional differential pressure value may be greater than the differential pressure value and may be added to the NTSP, because at block 210 the method 198 utilizes the NTSP stored on the memory device 120 that is associated with a prior operation of the HVAC system 100. In other words, the NTSP stored on the memory device 120 and utilized at block 210 may be an NTSP value generated during prior execution of the method 198 during previous operation of the HVAC system 100 to satisfy a prior call for cooling. Thus, as will be appreciated, the prior NTSP value may be a relatively low suction pressure value. Accordingly, the NTSP value may be increased at block 210 to enable more efficient operation of the HVAC system 100 (e.g., the compressor 102) without setting the NTSP as the upper suction pressure limit (e.g., block 214), in some instances. The updated value of the NTSP determined at block 210 may be stored in the memory device 120 and/or database 122.

Following block 210, the method 198 may proceed to block 280. At block 280, the NTSP (e.g., updated NTSP established at block 210) may be compared to a maximum allowable suction pressure value, which may be the same maximum allowable suction pressure value referenced at block 256. For example, the controller 116 may be configured to compare the NTSP to the maximum allowable suction pressure value. The maximum allowable suction pressure value may also be a value stored in the memory device 120 and/or database 122. In some embodiments, the maximum allowable suction pressure value may be a predetermined value that is designated based on any suitable parameters or factors, such as a type of the compressor 102, a capacity of the compressor 102, a configuration of the HVAC system 100, other operating conditions or limits of the HVAC system 100, testing data, empirical data, regulatory standards, target or desired operating (e.g., efficiency) metrics, or any combination thereof.

In response to a determination that the NTSP is not greater than or equal to (e.g., is less than) the maximum allowable suction pressure value, the method 198 may proceed to block 224 of the first control scheme 200 discussed above with reference to FIG. 6. From block 224, the method 198 may continue (e.g., resume) operation of the first control scheme 200 in the manner discussed above. In response to a determination that the NTSP is greater than or equal to the maximum allowable suction pressure value, the method 198 may proceed to block 282. At block 282, the maximum allowable suction pressure value may be established or set as the TSP (e.g., TSP value), such as by the controller 116. Thus, the method 198 may avoid operation of the HVAC system 100 with a TSP that is greater than the maximum allowable suction pressure value of the HVAC system 100. Thereafter, the method 198 may proceed to block 218 of the first control scheme 200, and the method 198 may continue (e.g., resume) operation of the first control scheme 200 in the manner discussed above.

As discussed above, at block 206 of the method 198, an upper suction pressure limit and a lower suction pressure limit within which the compressor 102 and/or HVAC system 100 is to be operated may be determined, such as by the controller 116. In some embodiments, the upper suction pressure limit and/or the lower suction pressure limit may be determined and/or selected based on predetermined values stored in the memory device 120. Additionally or alternatively, the upper suction pressure limit and/or the lower suction pressure limit may be determined based on one or more equations that may be stored in the memory device 120. In some embodiments, the upper suction pressure limit and/or the lower suction pressure limit may be determined based on a detected or determined operating parameter or characteristic of the HVAC system 100.

Figure 9:
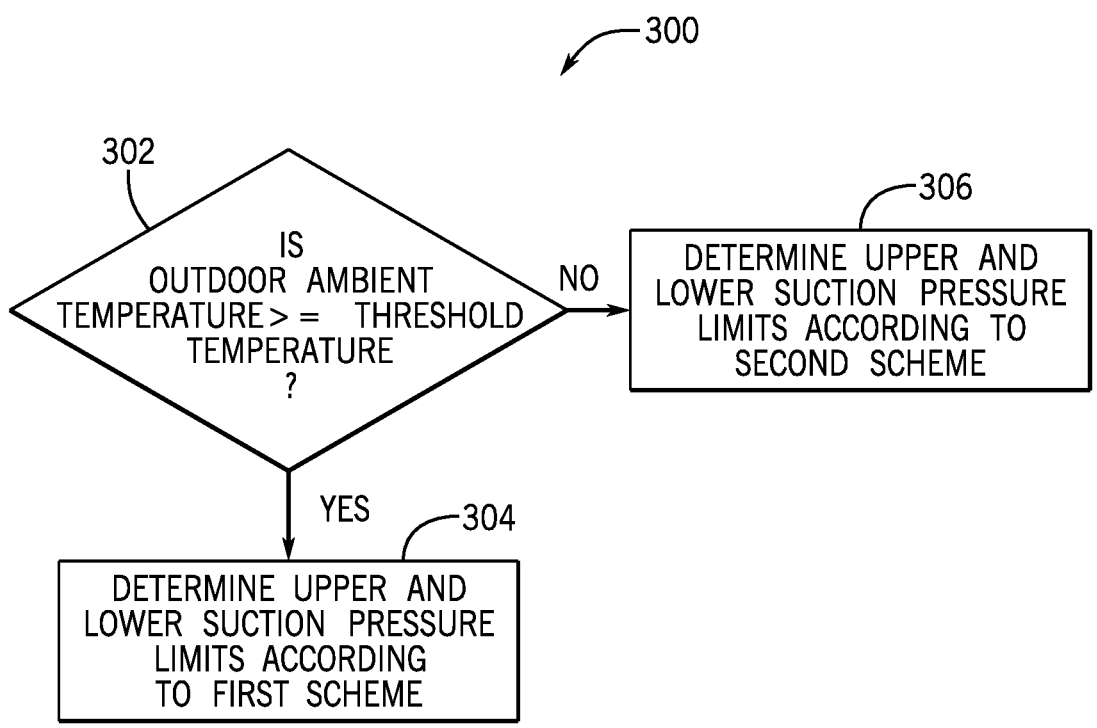
FIG. 9 is a process flow diagram of an embodiment of a method for controlling operation of an HVAC system, in accordance with an aspect of the present disclosure.

FIG. 9 is a process flow diagram of an embodiment of a method 300 for determining the upper suction pressure limit and the lower suction pressure limit of the HVAC system 100, in accordance with aspects of the present disclosure. For example, the method 300 may be executed (e.g., via the controller 116) at block 206 of the method 198 discussed above. The method 300 may begin at block 302, which includes comparing an outdoor ambient temperature to a threshold temperature (e.g., threshold temperature value). However, it should be appreciated that other operating parameters of the HVAC system 100 and corresponding thresholds may be referenced and compared at block 302. The outdoor ambient temperature may be a measured temperature detected by the HVAC system 100. For example, the first sensor 130 of the one or more sensors 128 may be configured to measure or detect the outdoor ambient temperature and provide data or feedback indicative of the outdoor ambient temperature measurement (e.g., value) to the controller 116. The controller 116 may be configured to reference the memory device 120 (e.g., database 122) to identify the threshold temperature. The threshold temperature may be any suitable temperature value, such as 27° C., 28° C., 29° C., 30° C., 31° C., or another suitable temperature value.

In response to a determination that the measured outdoor ambient temperature value is greater than or equal to the threshold temperature, the method 300 may proceed to block 304, whereby the controller 116 may determine the upper suction pressure limit and a lower suction pressure limit according to a first scheme (e.g., first calculation, first designation, first convention). In response to a determination that the measured outdoor ambient temperature value is less than the threshold temperature, the method 300 may proceed to block 306, whereby the controller 116 may determine the upper suction pressure limit and the lower suction pressure limit according to a second scheme (e.g., second calculation, second designation, second convention). In some embodiments, the first scheme of block 304 and the second scheme of block 306 may determine both the upper suction pressure limit and the lower suction pressure limit in different manners. In other embodiments, the first scheme of block 304 and the second scheme of block 306 may determine one the upper suction pressure limit and the lower suction pressure limit in a similar manner and may determine the other of the upper suction pressure limit and the lower suction pressure limit in a different manner.

For example, at block 304, the controller 116 may be configured to determine the upper suction pressure limit according to an equation associated with the first scheme, such as Equation (1) below.

$$(K_1 \times \text{Outdoor Ambient Temperature Value} + K_2) + \Delta Ptgt \quad (1)$$

As indicated by Equation (1), the outdoor ambient temperature value (e.g., measured by the first sensors 130) may be utilized as an input to Equation (1). $K_1$ and $K_2$ may be values (e.g., constant values) that are determined based on empirical data and/or testing data related to the HVAC system 100. Values of $K_1$ and $K_2$ may be different for different HVAC system 100 configurations (e.g., having different configurations and/or types of compressors 102). The respective values of $K_1$ and $K_2$ may be stored in the memory device 120 (e.g., database 122) and may be referenced by the controller 116 during execution of the step at block 304 and utilized as inputs for Equation (1). Equation (1) also includes $\Delta Ptgt$ as an input. The value of $\Delta Ptgt$ may also be stored in the memory device 120 (e.g., database 122) and may be referenced by the controller 116 during execution of the step at block 304. The value of $\Delta Ptgt$ may also be any suitable value (e.g., fixed value), such as 0.05 MPa, 0.07 MPa, 0.09 MPa, or any other suitable value. Utilizing the inputs described above, the controller 116 may calculate the upper suction pressure limit utilizing the Equation (1). However, it should be appreciated that other equations may be utilized to determine the upper suction pressure limit at block 304.

At block 304, the lower suction pressure limit may also be determined according to the first scheme. In some embodiments of the first scheme, the controller 116 may determine the lower suction pressure limit based on a value (e.g., fixed value, predetermined value) of the lower suction pressure limit that is stored in the memory device 120 (e.g., database 122). For example, a minimum allowable suction pressure value associated with the HVAC system 100 (e.g., a type of the HVAC system 100, a model of the HVAC system 100) may be set or established as the lower suction pressure limit. The minimum allowable suction pressure limit may be determined based on any suitable parameters, such as operational limitations of one or more components of the HVAC system 100, desired operating parameters of the HVAC system 100, and so forth.

At block 306, the controller 116 may determine the upper suction pressure limit and the lower suction pressure limit according to the second scheme. In some embodiments of the second scheme, the controller 116 may determine the lower suction pressure limit based on a value (e.g., fixed value, predetermined value) of the lower suction pressure limit that is stored in the memory device 120 (e.g., database 122), which may be the same or different from the value utilized to establish the lower suction pressure limit according to the first scheme. For example, a minimum allowable suction pressure value associated with the HVAC system 100 may be set as the lower suction pressure limit. Similarly, according to the second scheme, the controller 116 may determine the upper suction pressure limit based on a value (e.g., fixed value, predetermined value) of the upper suction pressure limit that is stored in the memory device 120 (e.g., database 122). In some embodiments, a maximum allowable suction pressure value associated with the HVAC system 100, which may be the same or similar to the maximum allowable suction pressure value discussed above, may be set as the upper suction pressure limit according to the second scheme. In other embodiments, one or more equations may be utilized in the second scheme (e.g., similar to the first scheme) to determine the upper suction pressure limit and/or the lower suction pressure limit.

The present disclosure may provide one or more technical effects useful in the operation of an HVAC system. In particular, the disclosed systems and methods enable to enable variable operation of modulating HVAC equipment, such as a compressor, when the modulating HVAC equipment is utilized with non-modulating (e.g., non-communicating) HVAC equipment, such as a non-communicating thermostat and/or a non-communicating air handler. For example, present embodiments implement a variable target suction pressure, which may be based on an operating parameter of the HVAC system (e.g., outdoor ambient temperature), to enable modulating of the compressor of the HVAC system (e.g., without use of data or feedback typically provided by communicating HVAC equipment). In this way, the disclosed systems and methods enable more efficient operation of the HVAC system to satisfy a load or demand (e.g., a cooling demand) on the HVAC system.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and air conditioning (HVAC) system, comprising:
a variable capacity compressor; and
a controller communicatively coupled to the variable capacity compressor and configured to:
receive a call for conditioning from a non-communicating thermostat:
initialize operation of the variable capacity compressor in response to receipt of the call for conditioning:
receive data indicative of an operating parameter of the HVAC system;
determine an upper suction pressure limit of the HVAC system based on the data;
determine a lower suction pressure limit of the HVAC system based on the data;
determine a target suction pressure value, wherein the target suction pressure value is less than or equal to the upper suction pressure limit and is greater than or equal to the lower suction pressure limit; and
modulate operation of the variable capacity compressor such that a detected suction pressure of the HVAC system approaches the target suction pressure value.

2. The HVAC system of claim 1, wherein the operating parameter comprises an outdoor ambient temperature, and the controller is configured to:
compare the data indicative of the outdoor ambient temperature to a threshold temperature value;
determine the upper suction pressure limit of the HVAC system based on the comparison; and
determine the lower suction pressure limit of the HVAC system based on the comparison.

3. The HVAC system of claim 1, wherein the controller is configured to:
determine an expected target suction pressure value based on the target suction pressure value; and
store the expected target suction pressure value in a memory of the controller.

4. The HVAC system of claim 3, wherein, subsequent to the determination of the upper suction pressure limit and the determination of the lower suction pressure limit, the controller is configured to set the upper suction pressure limit as the target suction pressure value in response to a determination that the expected target suction pressure value is absent from the memory.

5. The HVAC system of claim 3, wherein the controller is configured to reduce the target suction pressure value by a differential pressure value to determine the expected target suction pressure value.

6. The HVAC system of claim 5, wherein the controller is configured to compare the expected target suction pressure value to the lower suction pressure limit and, in response to the expected target suction pressure value being less than or equal to the lower suction pressure limit, set the lower suction pressure limit as the expected target suction pressure value.

7. The HVAC system of claim 1, wherein the call for conditioning comprises a 24-volt electrical signal.

8. The HVAC system of claim 1, wherein, in response to receipt of the call for conditioning, the controller is configured to initially operate the variable capacity compressor at a minimum allowable frequency for an initial time period.

9. A controller of a heating, ventilation, and air conditioning (HVAC) system, wherein the controller comprises a non-transitory, computer-readable medium having instructions stored thereon that, when executed by processing circuitry of the controller, are configured to cause the controller to:
receive a call for cooling from a non-communicating thermostat;
initialize operation of the HVAC system in response to receipt of the call for cooling:
receive data indicative of an operating parameter of the HVAC system;
determine an upper suction pressure limit of the HVAC system based on the data;

determine a lower suction pressure limit of the HVAC system based on the data;
determine a target suction pressure value of the HVAC system, wherein the target suction pressure value is less than or equal to the upper suction pressure limit and is greater than or equal to the lower suction pressure limit;
iteratively reduce the target suction pressure value; and
modulate operation of a compressor of the HVAC system based on the target suction pressure value.

10. The controller of claim 9, wherein the instructions, when executed by the processing circuitry, are configured to cause the controller to iteratively reduce the target suction pressure value by a differential pressure value.

11. The controller of claim 9, wherein the instructions, when executed by the processing circuitry, are configured to cause the controller to:
operate a timer for a designated time period;
determine a first frequency applied to the compressor at a start of the timer;
determine a second frequency applied to the compressor at an end of the timer;
compare the first frequency to the second frequency; and
reduce the target suction pressure value by a differential pressure value in response to a determination that the second frequency is greater than the first frequency.

12. The controller of claim 9), wherein the controller is configured to receive a 24-volt electrical signal as the call for cooling.

13. The controller of claim 9, wherein the operating parameter is an outdoor ambient temperature, and the instructions, when executed by the processing circuitry, are configured to cause the controller to:
compare the outdoor ambient temperature to a threshold temperature value;
determine the upper suction pressure limit of the HVAC system based on the comparison; and
determine the lower suction pressure limit of the HVAC system based on the comparison.

14. The controller of claim 13, wherein the instructions, when executed by the processing circuitry, are configured to cause the controller to:
determine the upper suction pressure limit and the lower suction pressure limit according to a first scheme in response to a determination that the outdoor ambient temperature is greater than or equal to the threshold temperature value; and
determine the upper suction pressure limit and the lower suction pressure limit according to a second scheme in response to a determination that the outdoor ambient temperature is less than the threshold temperature value.

15. The controller of claim 14, wherein the instructions, when executed by the processing circuitry, are configured to cause the controller to:
calculate, according to the first scheme, the upper suction pressure limit based on an equation stored on the non-transitory, computer-readable medium; and
set, according to the second scheme, a maximum allowable suction pressure value of the HVAC system as the upper suction pressure limit.

16. A heating, ventilation, and air conditioning (HVAC) system, comprising:
a compressor configured to operate at variable capacities; and
a controller configured to communicatively couple to the compressor, wherein the controller is configured to:
receive a call for cooling from a non-communicating thermostat;
initialize operation of the compressor in response to receipt of the call for cooling:
receive data indicative of an outdoor ambient temperature;
compare the outdoor ambient temperature to a threshold temperature value;
establish a lower suction pressure limit and an upper suction pressure limit based on the comparison;
determine a target suction pressure value, wherein the target suction pressure value is less than or equal to the upper suction pressure limit and is greater than or equal to the lower suction pressure limit; and
modulate operation of the compressor such that a detected suction pressure of the HVAC system approaches the target suction pressure value.

17. The HVAC system of claim 16, wherein the controller is configured to iteratively reduce the target suction pressure value by a differential pressure value.

18. The HVAC system of claim 16, wherein the controller is configured to determine the target suction pressure value based on a value of an expected target suction pressure value stored on a memory of the controller.

19. The HVAC system of claim 18, wherein the controller is configured to reference the value of the expected target suction pressure value stored on the memory subsequent to establishing the lower suction pressure limit and the upper suction pressure limit.

* * * * *